United States Patent [19]
Seidl et al.

[11] 3,877,209
[45] Apr. 15, 1975

[54] SYSTEM FOR MEASURING THE DRAFT OF OPEN-END SPINNING MACHINES

[75] Inventors: Pavel Seidl; Milos Mladek, both of Usti Nad Orlici, Czechoslovakia

[73] Assignee: Elitex, Zavody textilniho strojirenstvi generalni reditelstvi, Liberec, Czechoslovakia

[22] Filed: Sept. 17, 1973

[21] Appl. No.: 397,742

[30] Foreign Application Priority Data
Sept. 15, 1972 Czechoslovakia ................. 6322-72

[52] U.S. Cl. ............................... 57/34 R; 57/58.89
[51] Int. Cl. ...................... D01h 13/32; D01h 1/12
[58] Field of Search ................ 57/34 R, 81, 93, 94, 57/58.89–58.95, 97

[56] References Cited
UNITED STATES PATENTS

| | | | |
|---|---|---|---|
| 2,982,083 | 5/1961 | Breitenbach | 57/97 |
| 3,660,972 | 5/1972 | Neill et al. | 57/34 R |
| 3,678,673 | 7/1972 | Prochazka et al. | 57/58.95 |
| 3,680,299 | 8/1972 | Lee, Jr. | 57/34 R |
| 3,704,579 | 12/1972 | Tooka et al. | 57/34 R |
| 3,791,128 | 2/1974 | Landwehrkamp et al. | 57/93 |
| 3,803,823 | 4/1974 | Niestroj et al. | 57/34 R |

*Primary Examiner*—John Petrakes
*Attorney, Agent, or Firm*—Murray Schaffer

[57] ABSTRACT

An open end spinning unit having rotary feed means for delivering fibrous material, a rotary twisting means for spinning the fibers into a yarn and a rotary withdrawing means for taking up the yarn. A first detector means is located to sense the rotation of the withdrawal means and providing an output having a value proportional to the number of revolutions thereof. A second detector means is located to sense the rotation of the feeding means and providing an output having a value proportional to the number of revolutions thereof. The first detecting means is connected to the input of a first counter between which is interposed gate means. A second detecting means is connected to the input of a second counter, the output of which is connected to the input of the gate and indicator means is provided to read out the value received by said first counter.

5 Claims, 3 Drawing Figures

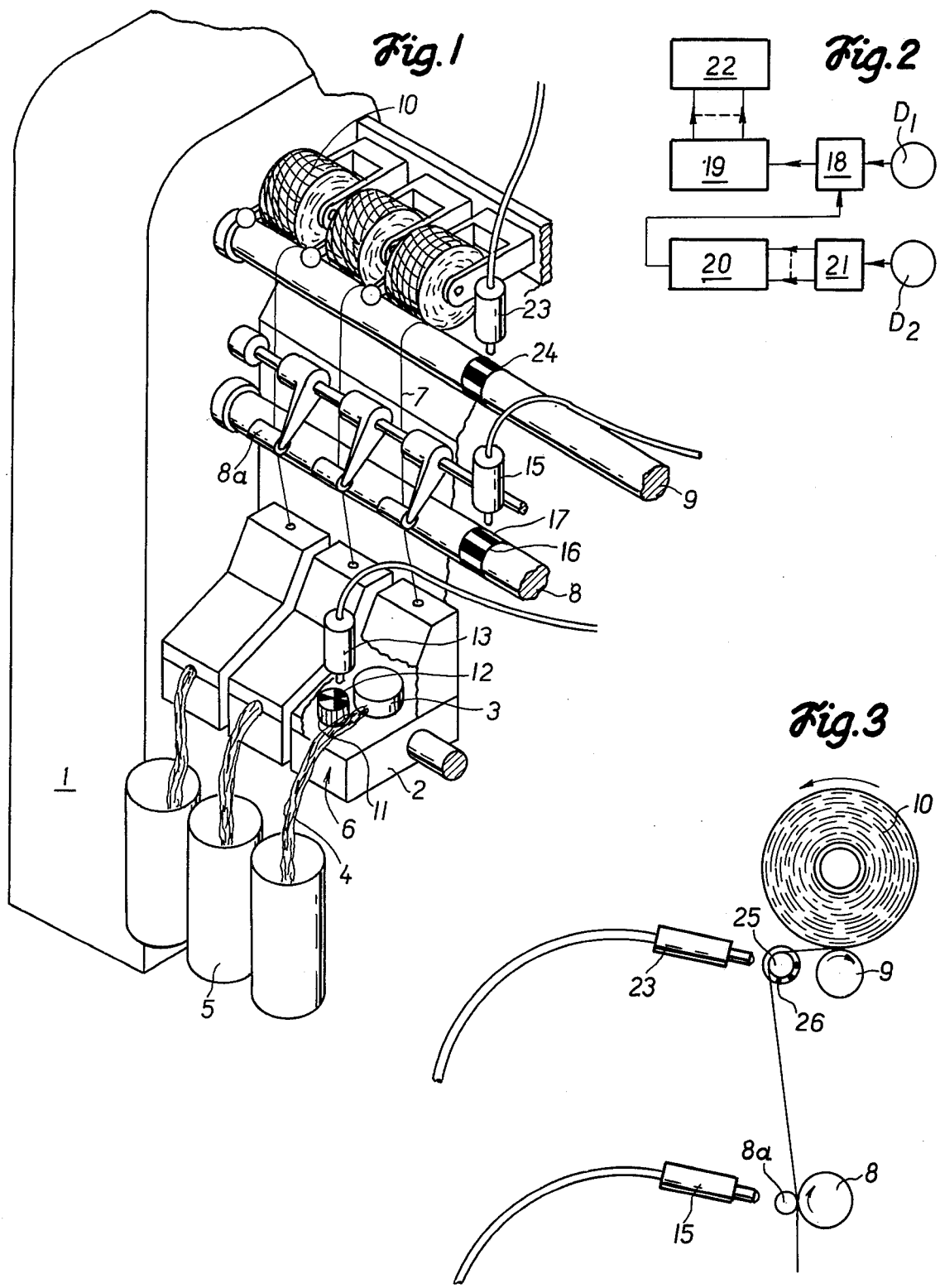

SYSTEM FOR MEASURING THE DRAFT OF OPEN-END SPINNING MACHINES

RELATED CASES

The present invention and disclosure is related to corresponding applications, Ser. No. 397,741 and Ser. No. 397,743, filed on even date herewith. Reference and incorporation of the subject matter disclosed therein is made as if more fully set forth herein.

BACKGROUND OF INVENTION

The present invention relates to a device for automatically measuring and indicating the draft in textile machines and in particular for measuring the draft of an open ended spinning machine so that adjustment of the machine may be made.

The measurement of the draft of an open end spinning machine up till now has been performed by actually measuring the speed of the withdrawing and feeding means by the use of tachometers and volt meters. The draft value being obtained as a result of the ratio between the withdrawing and the feeding speed. The measurement of the withdrawal speed has also been obtained by the use of mechanical gauges with or without timing devices.

The disadvantage of these methods consists in the necessity of performing two independent measurements and then subsequently making a manual calculation of the ratio between the two. In machines which have small yarn draft (values approximating one) the measurement of the draft is most difficult and faults easily arise. Moreover the determination of the draft value of the yarn is not automatic and cannot be immediately made, since after the actual measurements of the speed of the feed and withdrawing means is taken it is necessary to determine the ratio by manual calculation.

It is the object of the present invention of provide a system for securing a fast, easy and accurate measurement of the draft in an open end spinning machine.

It is a further object of the present invention to provide a system for the direct and automatic indication of the draft value during the operation of the textile machine and without the necessity for the shutting down of the machine or for making additive subsequent calculations. It is a further object of the present invention to provide a system for automatically determining the draft in an open end spindleless spinning machine which may be used directly and automatically for the subsequent adjustment of the machine units itself.

The aforementioned objects, together with numerous other objects and advantages will be seen from the foregoing disclosure of the present invention.

SUMMARY OF INVENTION

According to the present invention a system for measuring and indicating the draft in an open end spindleless spinning unit having rotary feed means for delivering fibrous material, a rotary twisting means for spinning the fibers into yarn and a rotary withdrawing means for taking up the yarn is provided. The system comprises locating a first detector means for sensing the revolution of the withdrawing means and providing an output having a value proportional to the number of such revolutions and locating a second detecting means for sensing the revolution of the feeding means and providing an output having a value proportionate to the number of revolutions of this means. These two detectors are connected to a measuring and indicating circuit by which the ratio between the two can be easily established and indicated to give the draft value. In the circuit the first detector means is connected to the input of a first counter and the gate means is interposed between this first detector and the counter associated with it. The second detecting means is connected to the input of a second counter, the output of which is connected to the input of the gating means. An indicator is connected to the first counter to record the value received by the first counter. The gating means is normally open to permit input into the first counter but is closed upon receipt in the second counter of a predetermined value. Since the number of revolutions detected by each of the detectors is fixed in dependence upon the speed of the withdrawal means and feed means respectively the output of the first counter as soon as it is stopped would be an indication of the ratio between the two.

The second counter may if desired be provided with a decade number switch which may be used for the purpose of decimally precising or shortening the indicated value fed to the counter.

The reliability of the system is enhanced when both the detector of the number of revolutions of the withdrawal means and the detector of the number of revolutions of the feeding means are contactless and preferably in the form of a photocell providing an electric output pulse. The elements, the rotation of which is to be sensed is provided with at least one optical mark or a plurality of uniformly spaced marks so as to provide uniform pulses in the detectors as a result of their rotation. The system according to the present invention has several advantages. The apparatus required is rather simple comprising only several detector units and a measuring and indicating system which may be formed of simplified circuitry. The indication may be made on a digitronic, digital and/or analog readout device such as a discharge tube or the like by which the measured value obtained can be read directly in either its digital or analog forms.

Full details of the present invention are given in the following description and are shown in the accompanying drawings.

BRIEF DESCRIPTION OF DRAWINGS

In the drawings:

FIG. 1 is a perspective view of an open ended spinning machine showing several spinning units arranged in alignment, one of which having attached thereto the detectors of the present invention, FIG. 2 is a circuit diagram of the evaluation circuit employed to measure and indicate the ratio obtained in accordance with the present invention, FIG. 3 is a schematic view showing a further embodiment of the present invention in which the additional draft between the take up rollers and the winding rollers can be measured.

DESCRIPTION OF INVENTION

The present invention is applied to an otherwise conventional open end spinning machine of which there are numerous commercial embodiments available. As is seen in FIG. 1 the spinning machine comprises a frame 1 on which a plurality of spinning units 2 are aligned. Each unit comprises a rotary spinning turbine 3 mounted to rotate about a central axis. A sliver 4 of fibrous material is withdrawn from a container 5 and fed by means of a feeding mechanism 6 to the turbine 3 wherein under centrifugal action the fibers are spun into a yarn 7 which is withdrawn between a rotating take up beam 8 and a cooperating press down arm 8a and a spaced winding beam 9 onto a bobbin 10.

In accordance with the present invention the feeding mechanism 6 includes at least one rotatable wheel 11 engaging the sliver 4 and acting to propel the fibers of the sliver 4 into the turbine 2. The frontal face of the feed roller 11 is provided with a plurality of optical markings 12 and is opposed by a contactless detector 13, preferably of the photoelectric type. The optical marks 12 and the detector 13 are designed so that the detector has an output value proportional to the number of revolutions of the feed roller 11. The number of optical marks 12 is thus selected in dependence upon the necessary number of pulses from detector 3 relative to the unit length of the sliver 4 fed to the turbine 2 so as to provide this proportional value. The marks 12 may be constituted by locally different light reflective coatings although preferably because of the environment of the spinning machine itself should be made of black coating so as to provide ample contrast for the photoelectric cell.

A second detector 15 is mounted adjacent the withdrawing beam 8 and impinges upon its circumferential surface. The withdrawal beam 8 is provided with a tape 16 beneath the viewing area of the detector 15 which tape is provided with optical markings 17 similar to those found on the feed roller 11. The detector 15 and the tape 16 are designed so that the output of the detector 15 produces a pulse value proportional to the number of revolutions made by the withdrawing beam 8. Preferably the value derived by the detector 15 is analogous to the number of passages of the optical marks through the plane of the detector.

The evaluating circuit by which the measurement and indication of the ratio is made is shown in FIG. 2. The circuit comprises a pair of detector inputs $D_1$ and $D_2$. The detector input $D_1$ is connected to a gating means 18 which has an output connected to a first counter 19 and another input from a second counter 20. The second detector input $D_2$ is connected to a decade number 21, the outputs of which lead to the second counter 20. The first counter 19 has a series of outputs connected to a digitronic indicator which may be a digital or analog value indicator containing storage and memory means.

In employing the evaluation circuit of FIG. 2 to determine the draft between the infed sliver 4 and the withdrawn yarn 7 as withdrawn over the take up beam 8, the detector input $D_1$ is connected to detector 13 scanning the infeed roller 11 while the detector input $D_2$ is connected to the detector 15 scanning the revolution of the take up beam 8. The draft value may be given by the relationship $P = L_1/L_2$ where $L_2$ is the yarn length withdrawn over the take up of beam 8 while $L_1$ is the length of the sliver fed to the rotating turbine 3 during an equal time period to maintain the proper ratio between the two the optical marking 17 on the withdrawing beam 8 and the optical markings 12 on the feed roller 11 and their respectively associated detecting means are arranged such that the detector 15 emits one pulse after the withdrawal of one cm of yarn 7 from the turbine and the detector 13 emits one pulse after the feeding of one cm of sliver 4 into the spinning turbine.

Assuming that the detector 13 is connected via the decade number switch 21 to the input of the last decade of the second counter 20, the two counters 19 and 20 begin to read the pulses from detectors 15 and 13 respectively at the same moment. Putting the counters 19 and 20 and thus the entire system into operation can be performed by the manual operation of the gate 18 controlled by an attendant. It is also possible to bring the device automatically into operation by an actuating member controlling the gate 18 at predetermined intervals. Set in this manner, after ten pulses from the detector 13, the second counter 20 emits a signal which is transmitted to the gate 18. The gate 18 having been opened either manually or automatically as noted above allows a signal to pass from the detector 15 through the detector input $D_1$ into the first counter 19. The signal from the secondary counter however closes the gate 18 and thus prevents the counter 19 from receiving signals via the detector input $D_1$. The number of input pulses received by the counter 19 is stored therein. This number depends upon the draft ratio, for example if the draft ratio is 50 then the number of pulses which had been received prior to closing the gate 18 in the counter 19 will be 50 times more than the number of pulses received by the second counter 20. Thus, if the second counter 20 has received 10 pulses then the number of pulses derived from the detector 15 into the counter 19 is 50 times 10 or 500 pulses. The number thus accumulated in the counter 19 is 500 and on transmittal of this accumulation to the indicating device 22 the number 500 would appear on the digital indicating tubes or the analog of the number 500 on the analog indicating tubes.

If in that number, the decimal point is correctly indicated by adjusting the switch of the decade switch 21, the draft value may be thus directly indicated. Switch 11 determines how many pulses are recorded during its measurement by the secondary counter 20. Thus the indication in the indicating unit 22 can be projected or read out as 50, 50.0, 50.00, or similarly to a degree of accuracy in measurement as desired.

The present system may be also used to measure the additive draft, which takes place between the withdrawing beam 8 and the winding beam 9 by arranging a detector 23 and an optical indexing marking tape 24 in connection with the beam 9 in a similar manner to that arranged with regard to the beam 8. In this event the withdrawing beam 8 functions in the manner of the feed means 11 and thus would be connected to the detector input $D_2$ of the system shown in FIG. 3 while the detector 23 would be connected to the detector input $D_1$. In evaluation, measurement and indication comparing the pulse signals from detectors 15 and 23 is made analogously to the preceding embodiment.

It is also possible to separately measure the actual additive draft and adjust the motion of the wind up beam 9 in response thereto. To determine the additive draft in this manner it is necessary to directly detect the motion of the yarn 7. Accordingly an auxiliary wheel 25 (as seen in FIG. 3) is interposed between the take up beam 8 and the wind up beam 9. The wheel 25 is provided with optical markings 26 in opposition to which the detector 23 is placed. The detector 23 views the optical markings 26 and provides the input to the detector input $D_1$ in the manner similar to that previously described.

It is also possible to obtain a ratio of one pulse from detectors 15 or 23 relative to the required length of yarn withdrawn from the turbine by detecting the number of revolutions of a wheel (not shown) which wheel is placed into circumferential contact with either the withdrawing beam 8 or the winding beam 9. The wheel having a suitable diameter.

The system and spinning unit may be provided with means by which the draft may be continuously changed, that is by varying the speed at which the withdrawal beam 8 and/or the wind up beam 9 may be driven. Preselection circuits may be provided for adjusting the required value of the draft and possibly checking and maintaining said value over a continual period of time after repetitive measurements are made in the counter 19.

The term counter as used herein is a device or circuit which counts input pulses, accumulates and stores the pulses and provides an output signal directly or proportionally indicative to the number of such pulses received. As used herein gating means may be defined as a device or circuit which may be selectively operable to pass a pulse or a signal in one direction and which may be switched into or open positions and/or closed positions. As used herein a decade switch may be defined as having two or more sections, each having ten times the value of the preceding section and each section divided into ten equal parts. Each section has a ten position selector switch or equivalent arrangement such that it may be set at any given desired value within its range.

The foregoing description is intended to be illustrative only of the present invention and not limiting of its scope.

What is claimed is:

1. A system for measuring and indicating the draft of an open end spinning unit having rotary feed means for delivering fibrous material, a rotary twisting means for spinning the fibers into a yarn and a rotary withdrawing means for taking up the yarn, comprising a first detector means located at said withdrawing means for sensing the rotation thereof and providing an output having a value proportional to the number of revolutions thereof, a second detector means located at said feeding means for sensing the rotation thereof and providing an output having a value proportional to the number of revolutions thereof, a first counter, said first detecting means being connected to the input of said first counter, gate means interposed between said first detector and said first counter, a second counter, said second detecting means being connected to the input of said second counter, the output of said second counter being connected to the input of said gate, to read out the value received by said first counter.

2. The system according to claim 1 including a decade number switch interposed between the second counter and its associated detector.

3. The system according to claim 1 wherein said detectors are contactless.

4. The system according to claim 3 wherein said detectors are photoelectric devices and said rotary feed means and said rotary withdrawing means are provided with at least one optical marking indicia.

5. The system according to claim 1 including a rotatable wheel engaging the withdrawn yarn, said wheel being provided with at least one optical marking, and a photoelectric detector scanning said optical mark.

* * * * *